June 7, 1966   J. W. DEMPSTER ETAL   3,254,875
TRANSPORTING EQUIPMENT
Filed Jan. 22, 1964   8 Sheets-Sheet 1
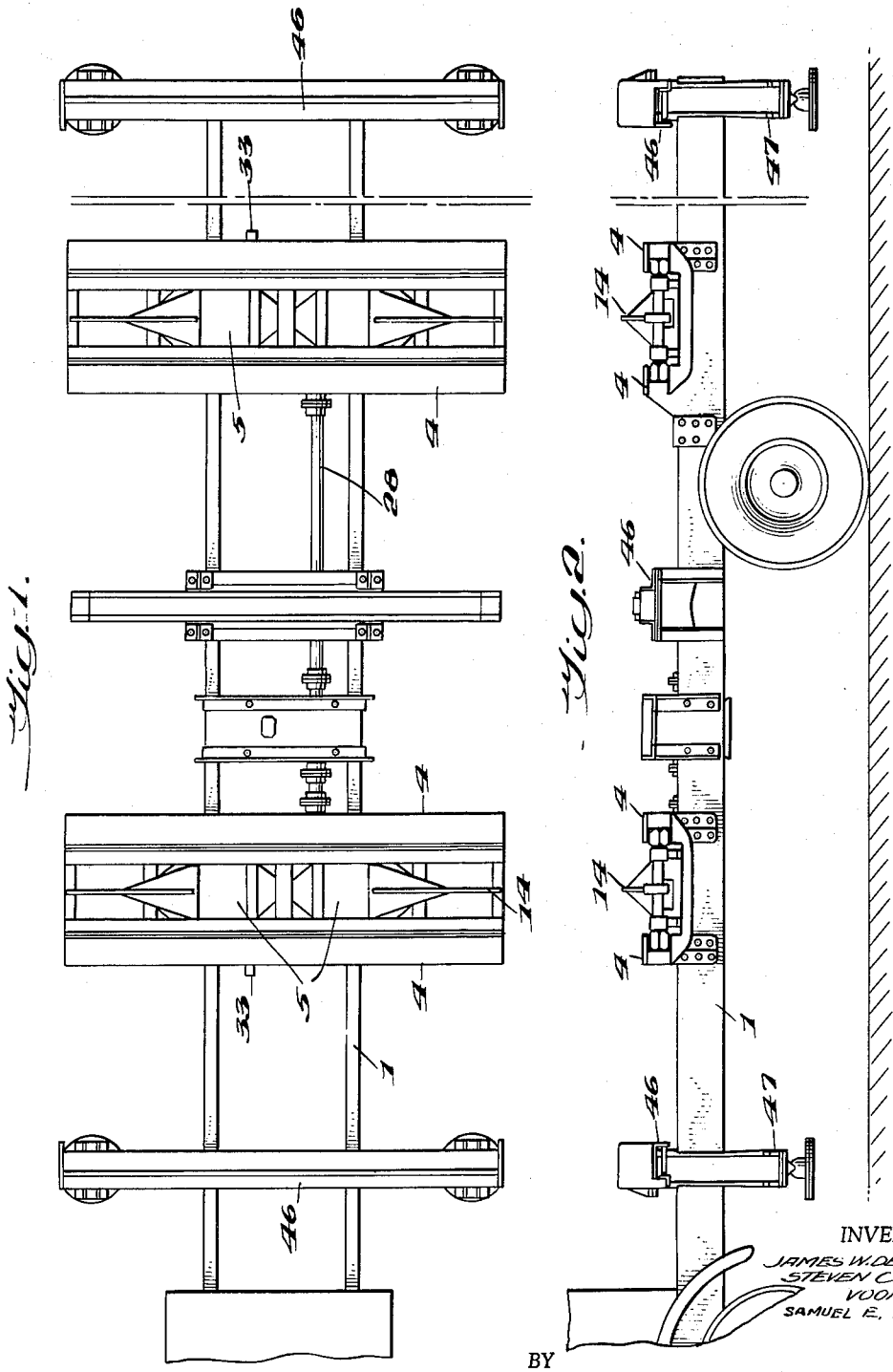
INVENTORS
JAMES W. DEMPSTER
STEVEN C. VOORHEES,
SAMUEL E. HARVEY
BY
ATTORNEY June 7, 1966 J. W. DEMPSTER ETAL 3,254,875
TRANSPORTING EQUIPMENT
Filed Jan. 22, 1964 8 Sheets-Sheet 2

INVENTORS
JAMES W. DEMPSTER,
STEVEN C. VOORHEES,
SAMUEL E. HARVEY,
BY
ATTORNEYS

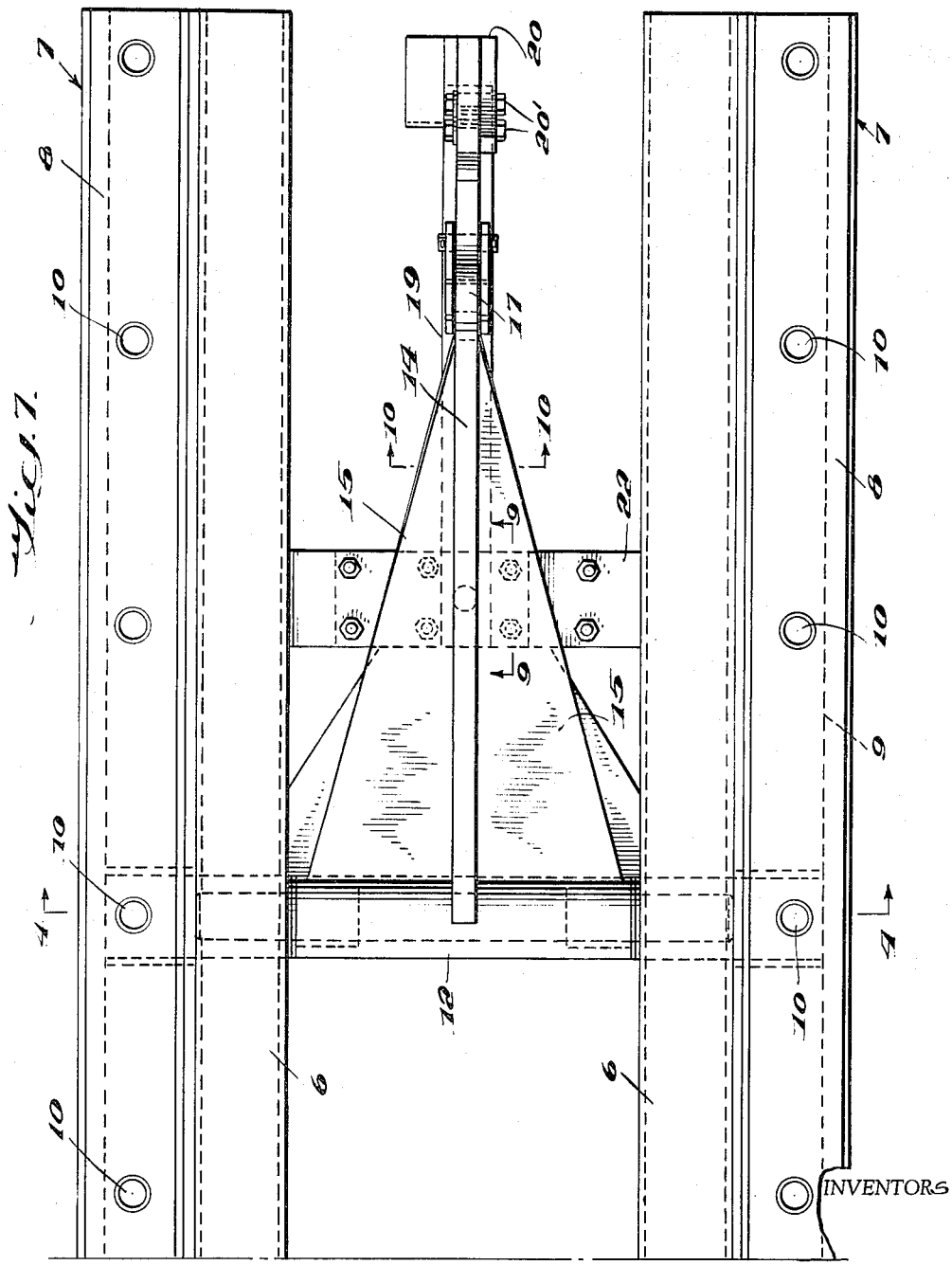

June 7, 1966  J. W. DEMPSTER ETAL  3,254,875
TRANSPORTING EQUIPMENT
Filed Jan. 22, 1964  8 Sheets-Sheet 4
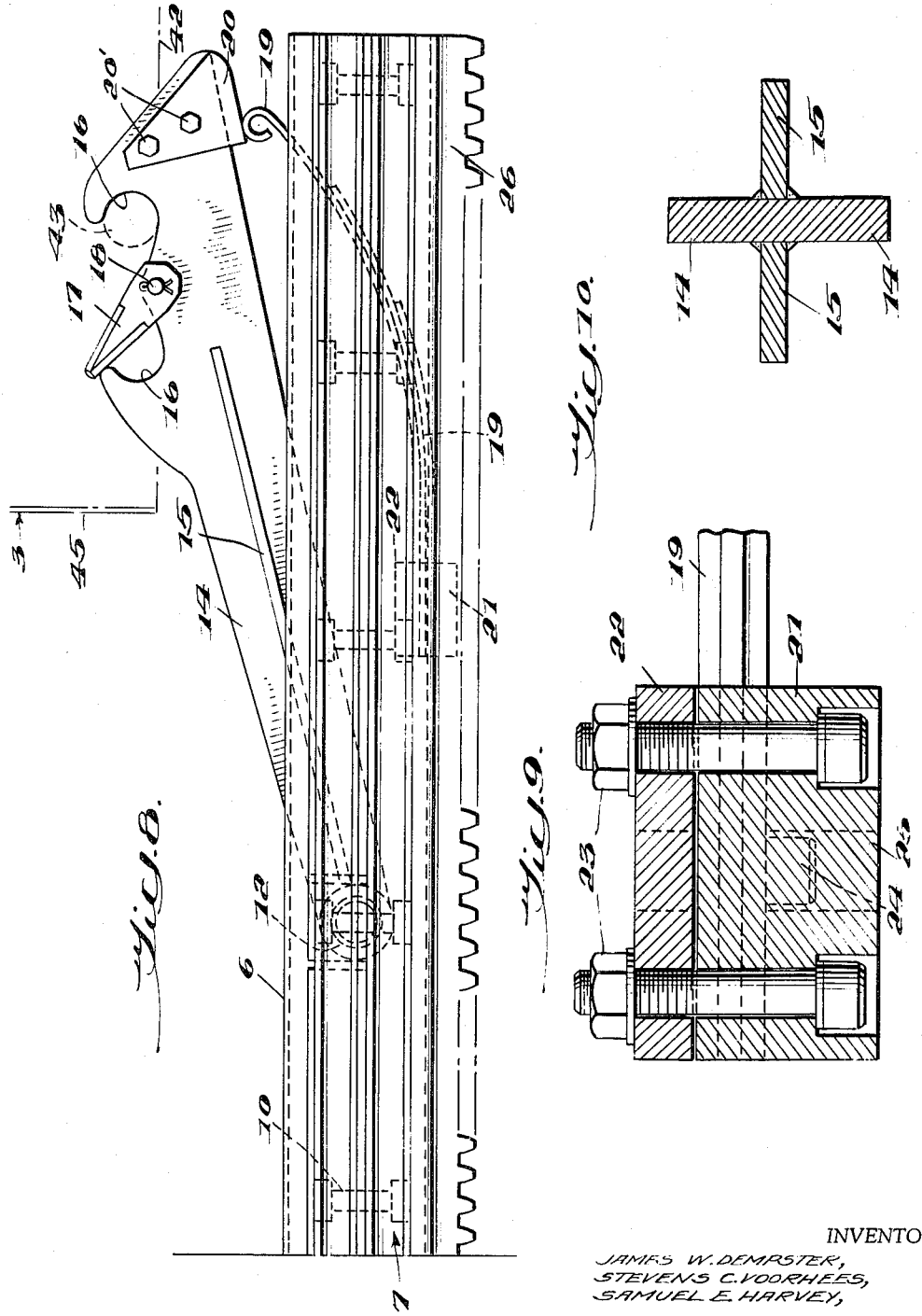
INVENTORS
JAMES W. DEMPSTER,
STEVENS C. VOORHEES,
SAMUEL E. HARVEY,
BY
ATTORNEYS

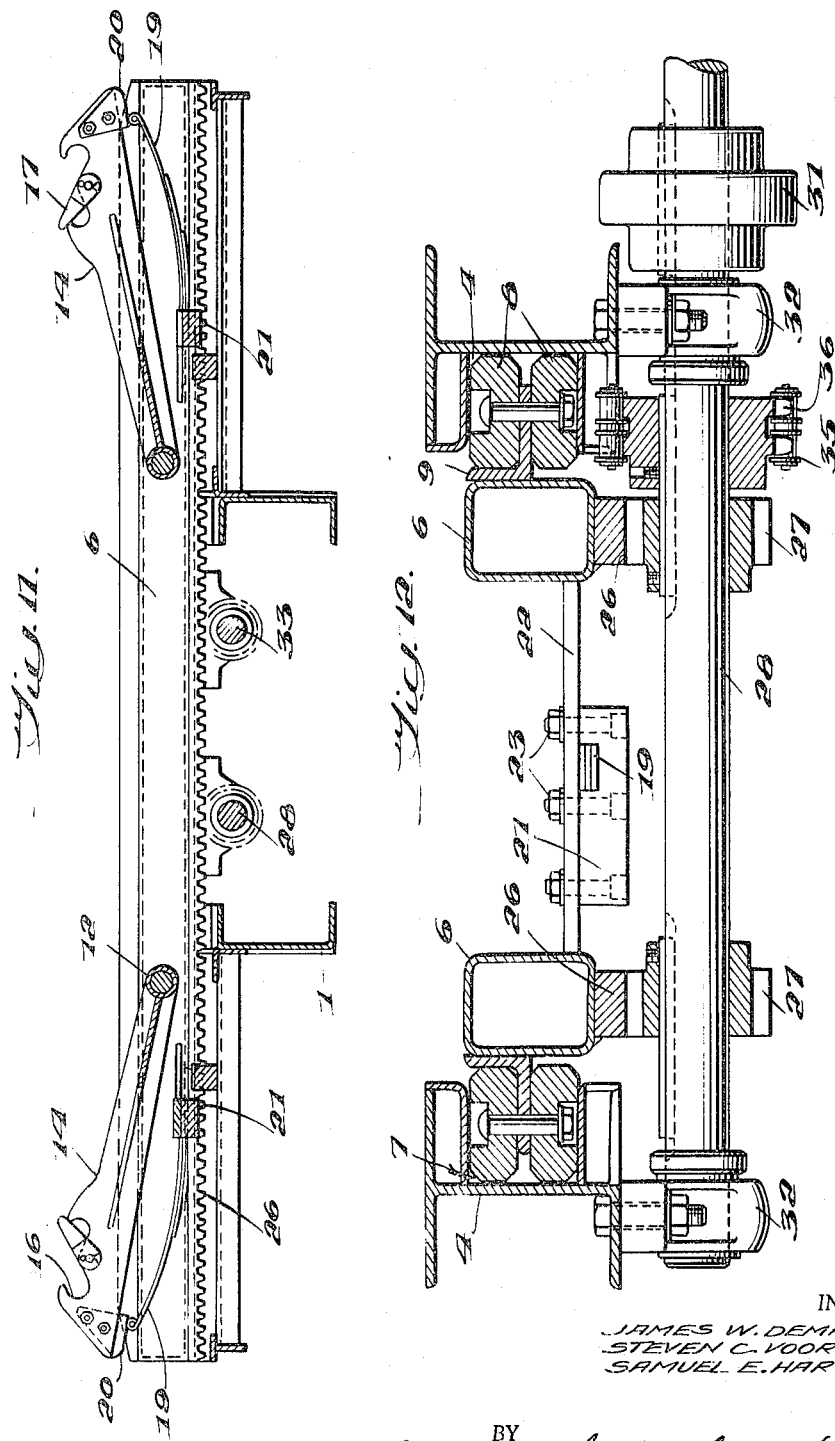

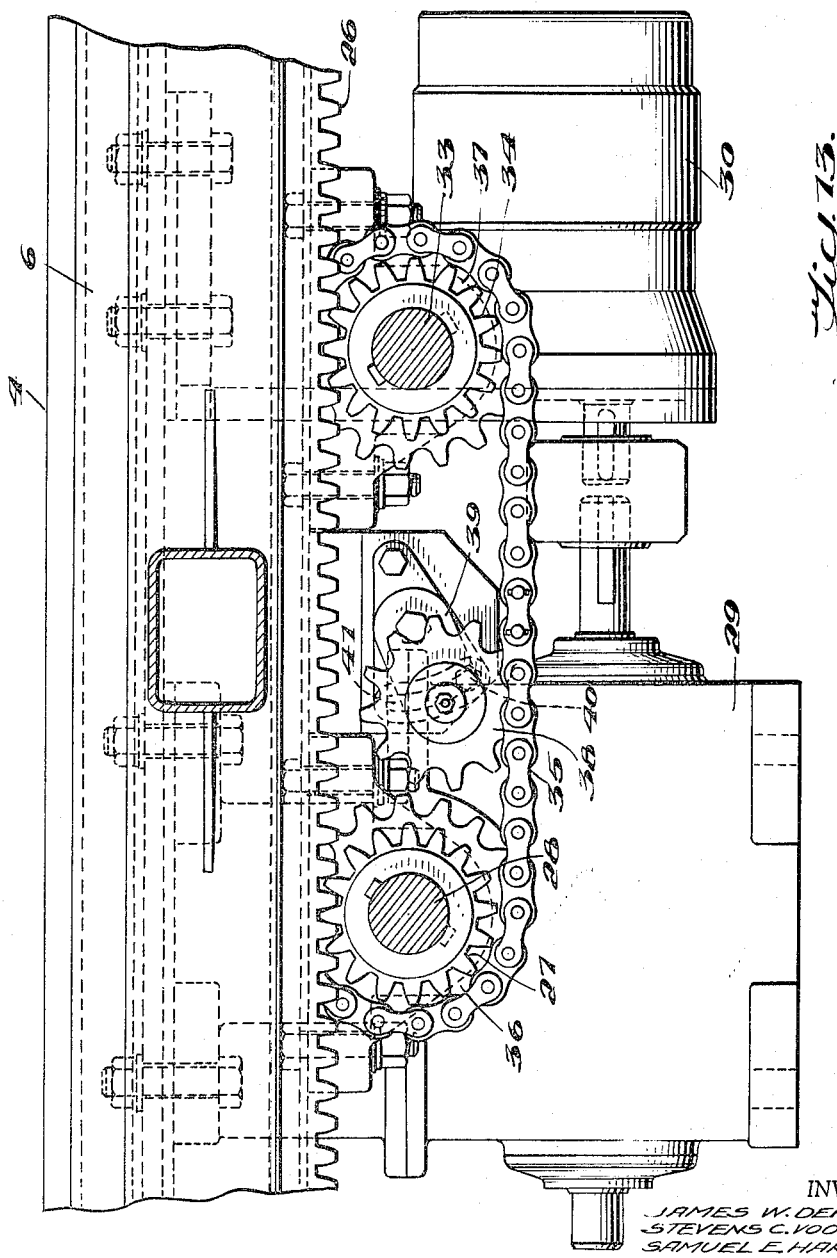

June 7, 1966  J. W. DEMPSTER ETAL  3,254,875
TRANSPORTING EQUIPMENT
Filed Jan. 22, 1964  8 Sheets-Sheet 7

INVENTORS
JAMES W. DEMPSTER,
STEVEN C. VOORHEES,
SAMUEL E. HARVEY,

BY
ATTORNEYS

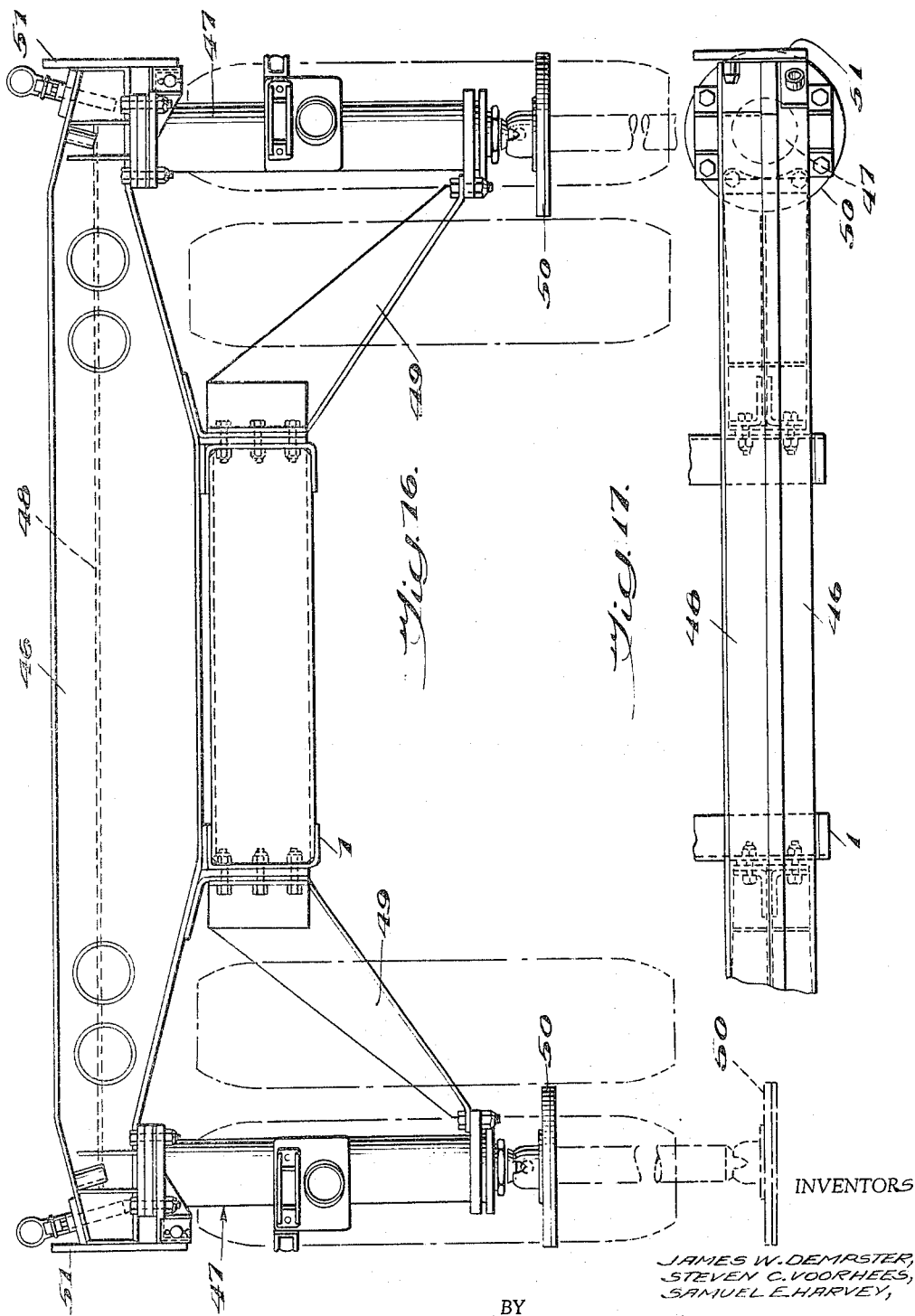

United States Patent Office 3,254,875
Patented June 7, 1966

1

3,254,875
TRANSPORTING EQUIPMENT
James W. Dempster, Steven C. Voorhees, and Samuel E. Harvey, all of Knoxville, Tenn., assignors to Dempster Brothers, Inc., Knoxville, Tenn., a corporation of Tennessee
Filed Jan. 22, 1964, Ser. No. 339,538
2 Claims. (Cl. 254—97)

This invention relates to improvements in transporting equipment and more particularly to equipment adapted to be mounted on a motor vehicle for moving large containers, such as vehicle bodies onto and off vehicle and interchanging the same with other vehicles including railroad cars.

A system has been proposed heretofore of handling large containers and shifting such containers interchangeably between road vehicles and railway cars, which method of operation has proven to be highly successful in that it requires a minimum of time for making the transposition and yet affords easy shifting action of the container or body and secure mounting thereof alternately on the railway car and on the road vehicle.

One object of this invention is to improve the construction of the equipment by simplifying the part thereof on the container or body and by improving the method of interengagement between the handling equipment and the container or body for smoothness of operation and a reduction in the likelihood of interference with the proper operation thereof.

Another object of the invention is to provide bail hook means on the road vehicle which is simple in construction, but sturdy and capable of handling large size and heavy bodies or containers in the interchangeable shifting thereof between the road vehicle and either another road vehicle or a railway car.

Still another object of the invention is to provide a pair of hook surfaces in opposed relation to each other on the operating equipment provided on the control vehicle capable of reaching up under a body or container on the same or other vehicle including a railway car and to be interengaged with a fixed bail member on said body or container for shifting the latter transversely or therealong into a second position. This makes possible the automatic engagement and movement of the body or container in a desired direction.

In one embodiment, the body or container is provided with a series of fixed bail members secured rigidly between spaced frame members thereof, but exposed at the bottom of the body or container. The control vehicle is provided with a bail hook platform having one or more bail hook assemblies mounted thereon. Each bail hook assembly preferably is constructed with a pair of hook surfaces in opposed relation yieldably held in a raised position and mounted so as to interengage with the fixed bail members on the container.

A shuttle or other suitable means is provided to control the engagement of the hook surfaces with the bail members so as to permit engagement when the bail hook platform is moving in one direction and to prevent interference when the bail hook platform is moved in the opposite direction relative to the body or container. A shuttle member mounted between the opposed hook surfaces may be used for this purpose and has been found to be effective and satisfactory.

2

It is preferred that the platform include two such bail hook assemblies turned in opposite directions and disposed at opposite ends of the platform, each of which may have either one hook or a pair of hooks, but with the hooks of the pair disposed in opposed relation so as to function alternately in shifting the body or container according to the direction of movement of the platform.

The bail hook platform is mounted on suitable bearing supports within guides so as to direct the proper shifting movement thereof. Suitable power means, such as a rack and pinion, may be used for operating the equipment.

This embodiment of the invention is illustrated in the accompanying drawings, in which:

FIG. 1 is a top plan view of a control vehicle having this embodiment of the invention applied thereto;

FIG. 2 is a side elevation thereof;

FIG. 7 is a top plan view of the bail hook platform assembly;

FIG. 8 is a side elevation thereof;

FIG. 9 is a detailed cross section through the stop block on the line 9—9 in FIG. 7;

FIG. 10 is a detailed cross section through the hook bar on the line 10—10 in FIG. 7;

FIG. 11 is a cross section through the control vehicle showing the bail hook platform assembly, on the line 11—11 in FIG. 1, with parts omitted;

FIG. 12 is a cross section through the bail hook platform, taken on the line 12—12 in FIG. 1;

FIG. 13 is a cross section of the drive mechanism, on the line 13—13 in FIG. 1;

FIG. 16 is an end elevation of the control vehicle showing the jacks; and

FIG. 17 is a top plan view thereof.

Figure 3:
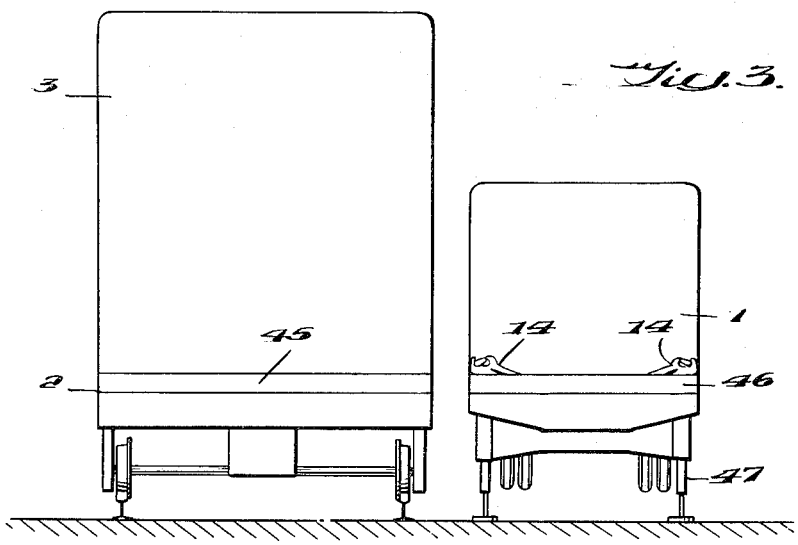
FIG. 3 is an end elevation showing the control vehicle including the improved equipment and disposed beside a body or container on a railway car.
Figure 4:
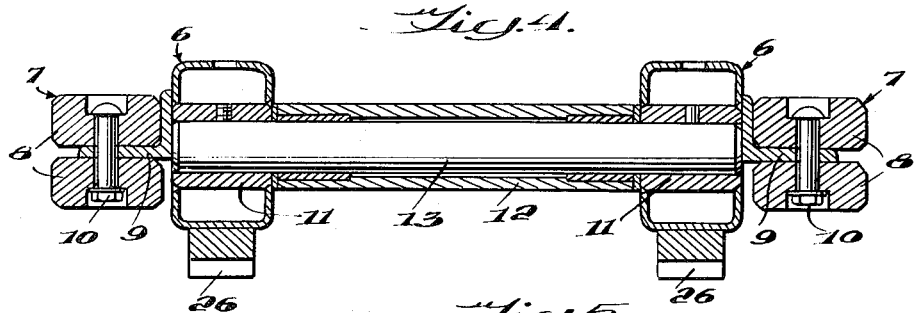
FIG. 4 is a cross section through the platform assembly on the line 4—4 in FIG. 7.
Figure 5:
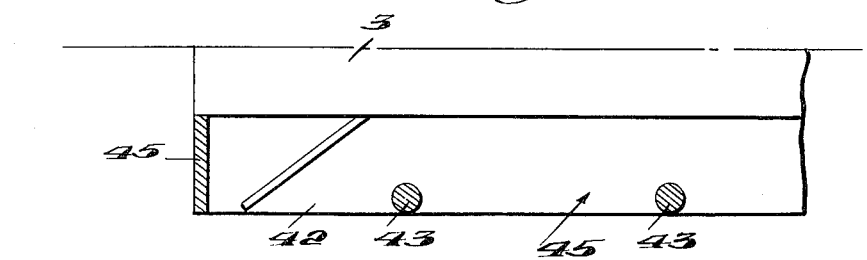
FIG. 5 is a detail longitudinal section through the bail section of the body.

This invention includes operating mechanism normally mounted on a control vehicle adapted to have a body or container interchangeably shifted between said control vehicle and a railway car, and the body or container may also be shifted onto a delivery vehicle, if desired, or delivery may be effected by the control vehicle itself.

The drawings illustrate an embodiment of the invention wherein a motor vehicle chassis is designated generally by the numeral 1 and is of conventional form, being self-propelled and provided with a power unit capable of operating the transfer mechanism. This vehicle is adapted to be moved into position beside a railway car, generally indicated at 2, which railway car is shown as having a body or container 3 thereon. The body or container 3 may be of any suitable or desired size relative to the vehicle, but should be a large capacity for efficient operation, and may extend, for example, throughout either one-half or the entire length of the railway car.

A motor vehicle trailer may be used either as the control vehicle or as the delivery vehicle. The delivery vehicle has provisions thereon for receiving and supporting the body or container during transportation, but usually it is not necessary that it include the transfer mechanism.

Mounted on the chassis frame of the control vehicle 1 are guide members 4, each of which preferably extends throughout the width of the chassis frame 1 and to the desired extent on opposite sides thereof (FIG. 1). A pair of these guide members 4 in opposed relation are disposed so as to mount a platform assembly, generally designated at 5, which extends transversely of the vehicle frame at one or more points along the length thereof. It is preferred to use two such platform assemblies for each body or container located adjacent opposite ends of the latter for smoothness of operation and proper control.

Each platform assembly 5 is shown as constructed with a pair of side rails 6 spaced apart and of a length to extend throughout the width of the vehicle. Each side rail 6 has a bearing support 7 on the lateral outside thereof in guided relation with one of the guides 4 so as to permit of lengthwise shifting movement of the platform assembly transversely of the vehicle and to be projected therefrom sufficiently for coupling engagement with the body 3 while retaining the guided relation. Each bearing support 7 is formed of a pair of strips 8 mounted on opposite sides of one flange of an angle bar 9 welded or otherwise secured to the adjacent rail 6 and extending lengthwise thereof. Bolts 10 connect the strips 8 with the angle bar 9 at intervals along the length thereof.

Mounted within each of the tubular side rails 6 is a bearing sleeve 11. These bearing sleeves 11 are in axial alignment with a tube 12 through which a bearing shaft 13 extends. The tube 12 is journaled upon the shaft 13. The shaft 13 forms a pivotal bearing for the bail hook assembly.

The bail hook assembly comprises a hook bar 14, fixed as by welding at one end thereof to the bearing sleeve 12 and extending outwardly therefrom, as shown in FIGS. 7 and 11. The bar 14 is braced laterally by gusset plates 15 welded along opposite sides of the bar 14 and substantially of triangular form, extending to the bearing sleeve 12 to which these gusset plates are also welded or otherwise fixed.

The outer end of the hook bar 14 is provided with a pair of opposed hook surfaces 16 formed therein and spaced a suitable distance apart so as to coact alternately with bail means on the body or container, as hereinafter described. As an example of the means which may be provided for controlling the engagement of the bail means with the respective hook surfaces 16, we have shown a shuttle member 17 of a length to overlap each of the hook portions 16 alternately. The shuttle 17 is pivotally supported at 18 on a portion of the hook bar 14 intermediate the hook surfaces 16 and is free to swing into covering relation with the respective hook surfaces, as will be apparent from FIG. 8. The shuttle 17 is moved by the bail bar and remains in its shifted position by gravity.

The hook bar 14 normally is held in a raised position with respect to the platform by a leaf spring 19, according to this embodiment of the invention, one end of which leaf spring is in bearing relation with a plate 20 on the bottom face of the hook bar 14, having frictional bearing relation against the bottom surface of said plate. The plate 20 is secured to the hook bar 14 by bolts 20′ extending through upright slots in said bar so as to provide for vertical adjustment of the bearing plate for variation in the normal height of the hook bar.

The opposite end of the leaf spring 19 extends into a stop block, generally indicated at 21, beneath a tie plate 22 that extends transversely between the side rails 6 of the platform assembly. Bolts 23 secure the stop block 21 to the tie plate 22, as shown in FIG. 9. The under side of the leaf spring 19 is provided with a pin 24 which engages in an opening 25 in the stop block 21 tending to hold the leaf spring in alignment with the hook bar 14 and preventing lateral shifting of the leaf spring relative to the hook platform.

As shown in FIGS. 1 and 11, a hook bar assembly of the character described is provided at each opposite end of the bail hook platform and the hook assemblies at the respective ends thereof are preferably turned in opposite directions. A pair of hook surfaces 16 preferably are used on each bail hook assembly but if desired one hook surface may be used on each hook bar and these respective hook surfaces turned in opposed relation, so as to be used alternately in shifting the body or container in opposite directions. It will also be apparent from FIG. 1 that a pair of bail hook platforms are used spaced lengthwise of the body or container for proper control thereof.

Suitable power means is provided for effecting shifting movement of each bail hook platform. In this embodiment of the invention, the power means comprises a rack 26 secured to the lower edge of each rail 6, preferably throughout the length thereof (see FIG. 11), and which is intermeshed with a gear 27. The gears 27 of the respective racks are mounted on a drive shaft 28 which may be operated from the powertake-off of the motor vehicle or in other suitable manner, one form of drive being described more in detail in application, Serial No. 255,481, filed February 1, 1963, now Patent No. 3,175,718, granted March 30, 1965.

By reference to FIGS. 1 and 2, it will be noted that we have shown two carriage assemblies on the control vehicle extending transversely thereof in longitudinally spaced relation. These carriage assemblies are adapted to be powered in either opposite direction so as to be coupled with a container located at either lateral side of the control vehicle or to direct a container off the control vehicle to either side thereof. The drive shaft 28, therefore, extends to each of these carriage assemblies and is coupled thereto in driving relation.

As shown in FIGS. 1 and 13, the drive shaft 28 is operated through a speed reducer, generally indicated at 29, the output side of which is coupled directly to the shaft 28 or geared thereto. The speed reducer 29 is driven, in turn, by a suitable motor 30, such for example, as a hydraulic motor operated by the power take-off from the motor vehicle. The operation of this motor 30, acting through the speed reducer 29, will drive the shaft 28 which is coupled to both of the carriage assemblies.

The shaft 28 is provided with suitable couplings along the length thereof, indicated at 31 in FIGS. 1 and 12. It is also mounted in suitable bearings, as indicated at 32 on the cross frame members that enclose the guides 4 for the carriage assembly.

At each of the carriage assemblies, there is provided an idler shaft 33 extending parallel with the shaft 28 and spaced therefrom. These shafts 28 and 33 are spaced uniformly on the opposite sides of the longitudinal center line of the motor vehicle.

The shaft 33 is also provided with a gear 34 meshing with each of the racks 26 of the corresponding carriage assembly. The shaft 33 extends across beneath the two racks 26 at each carriage assembly, but such idler shafts at the longitudinally spaced carriage assemblies are independent of each other, but both driven from the same drive shaft 28, as will be described. The purpose of having an additional driving motion for each of the racks 26 is that such action provides smoothness of operation, increasing the power applied thereto and effecting a driving motion between the longitudinal center line of the control vehicle and the outer end of the rack.

Figure 14:
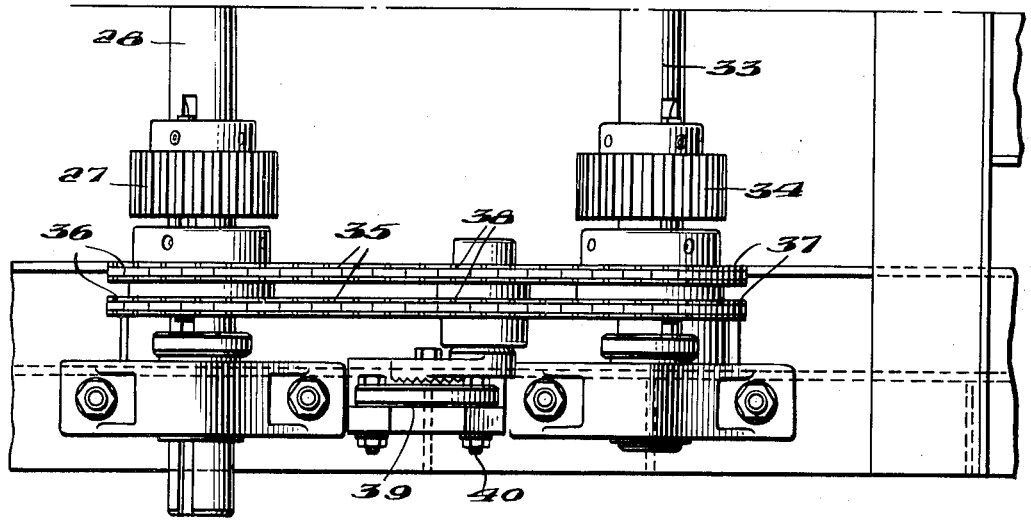
FIG. 14 is a bottom plan view of a portion thereof.

As a means of driving the idler shaft 33 and its gears 34 in accurate timed relation with the shaft 28 and gear 27, we have interconnected these shafts by sprocket chains 35 extending over sprockets 36 on the shaft 28 and over sprockets 37 on the shaft 33. Two such sprocket chains 35 are illustrated in FIG. 14, extending in parallel relation between the shafts 28 and 33 for effective driving action.

These sprocket chains 35 will transmit motion from the shaft 28 to the shaft 33 and thereby to the gears 34 on the latter. It is important that these be assembled in proper timed relation with the gears 27. Suitable indicia should be provided on the respective pinions, sprockets and racks to effect this result.

Figure 15:
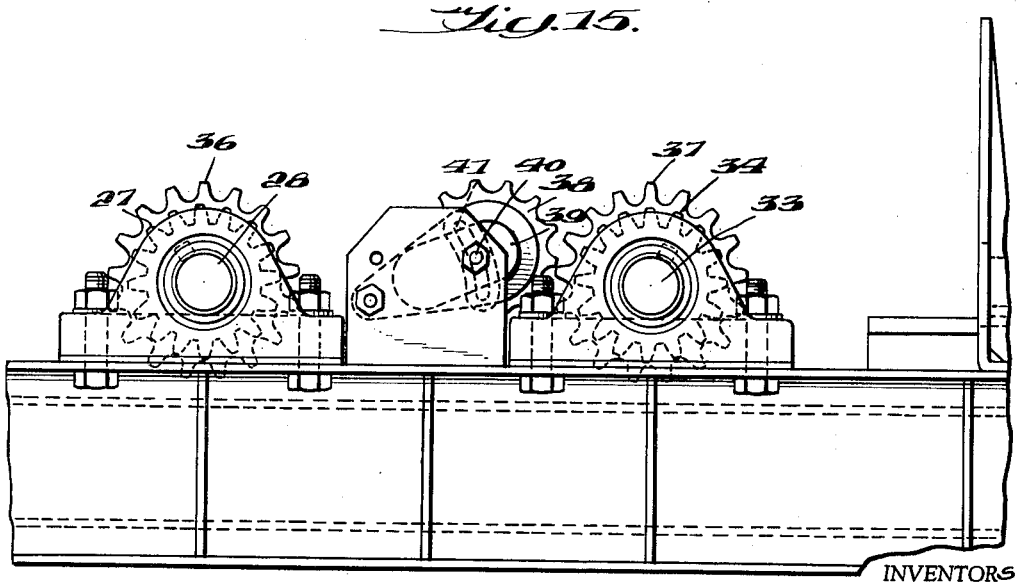
FIG. 15 is a side elevation thereof.

Provision should be made to maintain the sprocket chains 35 tight. We have provided, accordingly, idler sprockets 38 which will act as chain tighteners, meshing as they do with one run of each chain 35. These idler sprockets for tightening the chains are illustrated in FIGS. 13 and 15. As shown, a pair of idler sprockets is mounted on a journal supported by an arm, generally indicated at 39, pivoted for swinging movement in an upright direction and having a bolt 40 connected therewith and extending through a slot 41 in a fixed support. Suitable means should be provided for locking the bolt in an adjusted position which will hold the sprockets 38 in proper relation to the sprocket chains 35 to keep the latter in the desired degree of tightness.

This power drive means operates generally in the manner explained more in detail in application Serial No. 255,481, now Patent No. 3,175,718, except as herein indicated and as shown in the drawings.

The body or container 3 is provided with suitable frame structure under the bottom thereof, including a pair of spaced sills 42 having bail bars 43 extending therebetween. The stills 42 should be spaced apart a sufficient distance for accessibility of the hook bar 14 between the sills for access to the bail bars 43. Any suitable or desired number of bail bars may be used between the sills and spaced transversely of the body or container 3 according to the needs of handling thereof. Usually, three or four such bail bars will be sufficient, but the number thereof may be varied as desired. The frame structure under the body or container 3 may be provided, if desired, with a skirt portion, generally indicated at 44, covering this portion of the car providing a more uniform and desirable appearance, but which will not interfere with the proper functioning of the assembly.

Figure 6:
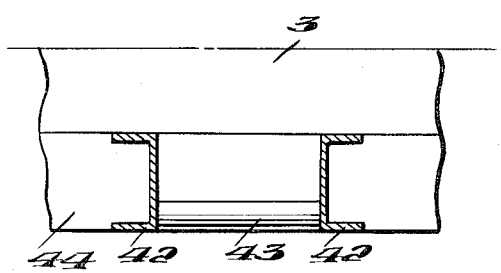
FIG. 6 is a cross section therethrough.

Each bail bar 43 should be located directly at the bottom edge of the pair of sills 42, with its lower edge tangent to the bottom edges of the sills, as shown in FIG. 6. This relationship insures of accessibility of the hook bar 14 and proper connection therewith during the operation of the equipment.

At opposite ends or at other suitable points along the length of the body or container 3, the latter is provided with transversely extending runner members 45 disposed for alignment with bolsters 46 on each vehicle. The bolsters 46 on the control vehicle may be raised or lowered for such alignment by hoists 47 connected therewith, as illustrated in FIGS. 16 and 17.

As shown in FIG. 16, each bolster 46 on the road vehicle extends across the chassis frame on which it is securely mounted. It is provided with a longitudinally extending shelf or seat 48 on one or both opposite sides. The cantilever end section of each bolster is secured upon the upper end of a hydraulic hoist or jack 47. The lower end of the hoist 47 is anchored by a step bracket 49 to the adjacent side of the chassis frame 1. The telescoped foot section 50 of each hoist is movable down to the ground to lift the vehicle, if needed, to the desired level.

The bolster members 46 should be spaced apart a distance corresponding with the length of the body or container 3 to support the latter in bridging relation therebetween as it is shifted from one vehicle to the other or is supported thereon for transportation. Suitable means should be provided for retaining the body or container 3 in place on the vehicle or on the railway car during transportation. Such means may include hold-down clamps, generally indicated at 51 in FIG. 16.

The equipment is capable of many variations in use in shifting a body or container between two vehicles or between a road vehicle and a railway car, as will be apparent from the foregoing explanation. An example of the use thereof will be described in the shifting of a body or container from a railway car to the control vehicle.

The body or container is normally seated in secure position between a pair of bolsters 46 on the railway car 2. When the control vehicle is moved up beside the car with the bolsters 46 on the control vehicle aligned with the bolsters on the car, the equipment is immediately in position for transfer operation. The operator engaged the power source to operate the shaft 28 which acts through the gears 27 and racks 26 as well as through the corresponding idler shaft 33 and its gears 34 to shift the bail hook platforms 5 toward the car. This motion continues until the hook bars 14 have moved inwardly past the corresponding bail bars 43.

The guiding surfaces provided on the ends of the hook bars 14 will allow the latter to ride under the skirt 44 and between surfaces of the body and initially under the bail bars 43, in yieldable fashion actuated by the leaf springs 19 of the respective hook bars. The operator will be able to hear the clicking contact and will know thereby when the hook bars have been moved far enough to engage with the bail bars, when he will simply reverse the action of the operating means, causing the hook surfaces 16 to engage the bail bars, and during such continued movement will shift the body or container off the railway car. This shifting motion can be continued step-by-step by successive actions engaging bail bars until the container is moved entirely from the railway car onto the control vehicle.

The pair of hook bars provided on each bail hook platform will permit of shifting of the body or container first onto the control vehicle and then over the latter onto a transport vehicle. If the latter operation is not necessary, one such hook bar may be used on each platform to shift the container back and forth between the control vehicle and a second vehicle, such as a railway car.

As the hook bar is shifted forward under the body or container and its end portion rides under a hook bar, the latter will swing the shuttle 17 over to the position shown in full lines in FIG. 8, thus preventing the hook bar from engaging in the opposed hook surface during the continued forward shifting movement of the hook bar in the event that the motion continues forward under more than one such hook bar in moving to an engaged position with the container.

When the equipment is used for pushing a container, the reverse action occurs and the hook bar is shifted so as to engage the opposed hook surface 16 with the bail bar 43. In that event, the forward motion of the platform assembly will cause the container to be pushed. A pushing and pulling action may be accomplished by either hook bar assembly when each of them is provided with a pair of opposed hook surfaces.

With this mechanism, the operating parts are on the control vehicle and only the fixed bail bars need be located on the body or container. These may be located in recessed relation, as described, with assurance that the hook bars will be moved up into proper operating relation therewith during the operation of the equipment.

While the invention has been illustrated and described in one embodiment, it is recognized that variations and changes may be made therein without departing from the invention as set forth in the claims.

We claim:

1. In transporting equipment, a platform assembly comprising a pair of elongated laterally spaced rail members, bearing supports beside the respective rail members and adapted for supporting the platform assembly on guideways, means connecting the bearing supports with the rail members, a sleeve extending form side-to-side between the rail members, a shaft connected with the rail members and having the sleeve journaled thereon, and a member fixed to the sleeve for hook engagement with a container, said member being disposed normal to the sleeve with an end portion embracing the sleeve, and plates on opposite sides of the member and extending along the sleeve in bridging relation between the sleeve and member and secured thereto for holding the member against transverse deflection.

2. In transporting equipment, a platform assembly for moving a container on a vehicle, said assembly comprising a pair of elongated laterally spaced rail members, a shaft extending transversely between the rail members and mounted thereon, a tube journaled on the shaft, a hook bar secured to the sleeve and having hook means thereon for engagement with the container to move the latter upon movement of the assembly, lateral braces secured to opposite sides of the hook bar and extending lengthwise thereof, a tie plate extending transversely between the rail members and supported thereon, a stop block supported by the tie plate, a leaf spring secured to the stop block and extending into bearing relation with the hook bar, means for holding the leaf spring in alignment with the hook bar, bearing supports secured to the respective rail members laterally on the outside thereof, support means having guideways receiving the bearings supports, and drive means operatively connected with the respective rail members.

References Cited by the Examiner
UNITED STATES PATENTS

| | | | |
|---|---|---|---|
| 1,821,327 | 9/1931 | Scott | 214—516 |
| 1,869,046 | 7/1932 | Buck | 214—516 X |
| 2,282,352 | 5/1942 | Fitch | 214—516 |
| 2,521,727 | 9/1950 | Kappen | 214—517 |
| 2,571,067 | 10/1951 | Seckendorf | 254—86 |
| 2,652,938 | 9/1953 | Murphy. | |
| 2,707,054 | 4/1955 | Alimanestiano. | |
| 2,837,312 | 6/1958 | Troche | 254—86 |
| 2,938,706 | 5/1960 | Langen | 254—106 |
| 3,001,662 | 9/1961 | Herpich | 220—1.5 |
| 3,031,167 | 4/1962 | Roussel | 254—105 |
| 3,107,020 | 10/1963 | Dempster et al. | 214—505 |
| 3,130,847 | 4/1964 | Dempster et al. | 214—505 |
| 3,140,005 | 7/1964 | Hand | 220—1.5 |

GERALD M. FORLENZA, *Primary Examiner.*

A. J. MAKAY, *Assistant Examiner.*